United States Patent Office 3,573,330
Patented Mar. 30, 1971

---

3,573,330
FLUORINATED EPOXIDES
Robert E. A. Dear and Everett E. Gilbert, Morris Township, County of Morris, N.J., assignors to Allied Chemical Corporation, New York, N.Y.
No Drawing. Filed Jan. 24, 1969, Ser. No. 793,891
Int. Cl. C07d 1/16
U.S. Cl. 260—348                                3 Claims

---

ABSTRACT OF THE DISCLOSURE 1,2-epoxy - 3,3,3 - trifluoro-2-trifluoromethyl-propane and 1,2-epoxy - 3,3 - difluoro-2-difluoromethyl-propane useful as nematocidal fumigants.

---

This invention relates to the new compounds 1,2-epoxy-3,3,3-trifluoro-2-trifluoromethyl-propane and 1,2-epoxy-3,3-difluoro-2-difluoromethyl-propane, useful as nematocidal fumigants.

Many different kinds of plants are known to be attacked by nematodes which are tiny worm-like organisms which live in the soil and feed on the roots of plants, both in the field and in greenhouses. Plants infested by nematodes will present a weakened, sickly appearance without visible injury to the stem or to any part of the plant above ground. An examination of the roots will show numerous types of injury including knots or galls characterized by a swollen appearance. In cases of sever infestation, these injuries not only reduce the size and effectiveness of the root system but also seriously affect other plant parts.

We have now discovered two new fluorinated epoxy compounds which are effective in controlling nematode infestations by treating the nematodes or nematode-infested areas or soils with a toxic quantity of such compounds.

The new compounds of our invention have the generic formula

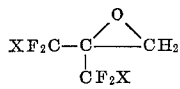

wherein each X is the same and is selected from the group consisting of hydrogen and fluorine. The above formula thus includes the individual compounds (I) 1,2-epoxy-3,3,3-trifluoro-2-trifluoromethyl-propane

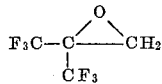

(II) 1,2-epoxy-3,3-difluoro-2-difluoromethyl-propane

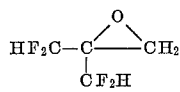

The discovery that the two new compounds shown above are effective nematocides is very surprising since a somewhat similar compound, wherein each X is chlorine, is ineffective in controlling nematodes. This fact is the more surprising since, in general, the addition of chlorine atoms tends to increase the toxicity of organic compounds to many living organisms.

The new compounds of our invention can be prepared by the reaction of diazomethane with the appropriate fluoroacetone, preferably in a liquid reaction medium such as a di-alkyl ether of appropriate boiling point efficiently different from that of the epoxy product to permit recovery of the latter by distillation. Reaction proceeds according to the equation set forth below.

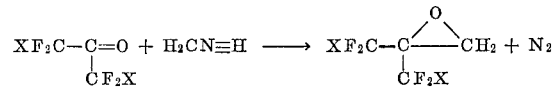

wherein X represents hydrogen or fluorine.

The new compounds of our invention have a number of advantages over prior art known fumigants, particularly over ethylene oxide $(CH_2)_2O$. The latter is not only dangerously flammable but is also so chemically unstable as to tend to undergo explosive decomposition under conditions often encountered in normal storage and use of such compounds. Our new compounds on the other hand are not only substantially non-flammable, but are exceptionally stable chemically, to such extent that they are stable under all the normally occurring conditions attendant on their use as fumigants, and even resist the action of such strong reagents as phosphorous pentachloride, sulfuric acid and nitric acid.

The following specific examples further illustrate our invention.

EXAMPLE 1

A solution of diazomethane in diethyl ether was prepared by mixing at a temperature of about 5° C., 50 grams (0.49 mol) of N-nitrosomethyl urea and 150 ml. of a 40% KOH solution in 500 ml. of diethyl ether, thus producing about 15 grams (0.36 mol) of diazomethane in solution. The ether portion of the solution was decanted and dried over KOH pellets. To the dry ether solution of diazomethane thus produced was added dropwise over a 2½ hour period, while maintaining the temperature at 0° C., 43.5 grams (0.334 mol) of 1,1,3,3-tetrafluoroacetone $(CF_2H)_2C=O$. The resulting yellow solution slowly evolved nitrogen. After all the ketone had been added, the solution was allowed to warm to room temperature (Ca. 20° C.); then excess ether was removed and the product distilled, producing 33.8 grams (70.2% of theory) of 1,2-epoxy-3,3-difluoro-2-difluoromethyl - propane, boiling point 97° C., refractive index $n_D^{25}$ 1.3341. Elemental analysis showed.

Calculated (percent): C, 33.34; H, 2.80. Found (percent): C, 33.11; H, 2.84.

EXAMPLE 2

Diazomethane was prepared by mixing at a temperature of about 5° C., 100 grams (0.97 mol) of N-nitrosomethyl urea and 300 ml. of a 40% KOH solution in 700 ml. of di-n-butyl ether as solvent. The resulting ethereal diazomethane solution, containing about 30 grams (0.72 mol) of diazomethane, was decanted, dried over KOH pellets and transferred to a Kjeldahl flask. Into this solution was passed 65 grams (0.39 mol) of gaseous hexafluoroacetone, while maintaining the temperature at −10° C., addition of hexafluoroacetone being continued until no further reaction was apparent as indicated by cessation of absorption of the gas into the solution. The resulting crude 1,2-epoxy-3,3,3-trifluoro-2-trifluoromethyl-propane was distilled from the ether solution. It amounted to 10 grams (25.8% of theory). The product was redistilled and yielded a purified 1,2-epoxy-3,3,3-trifluoro-2-trifluoromethyl-propane having a boiling point of 39° C. Elemental analysis showed.

Calculated (percent): C, 26.67; H, 1.12. Found (percent): C, 26.75; H, 1.16.

EXAMPLE 3

The compounds of Examples 1 and 2 were tested as nematocidal fumigants in comparison with the known compound 1,2-epoxy-3,3-difluoro - 3 - chloro-2-difluorochloromethyl-propane, sometimes called 1,1-bis(chloro-difluoromethyl)oxirane, as follows:

About 100 nematodes (*Panagrellus redivivus*) were placed in small Petri dishes (2" x ¾") containing 5 ml. of distilled water. The dishes were placed, open, in one gallon Mason jars with about 0.06 gram of the test compound equivalent to a concentration of about 1 pound per cubic foot of air. The test compound was placed in the jar on a cellucotton wad or in a small open container. As soon as the nematode containers and test compounds were in place, the jars were sealed. After 24 hours exposure, the nematode containers were removed and a mortality count was made. Results of these tests are shown in Table I below:

TABLE I.—NEMATOCIDAL FUMIGANT TESTS

| Compound of Example: | Percent mortality after 24 hours |
|---|---|
| 1 (X=H) | 100 |
| 2 (X=F) | [1] 45 |
| Known cpd. (X=Cl) | 15 |
| Check (no toxicant) | 5–10 |

[1] (Remainder near dead.)

It is apparent from the table that the new compounds of our invention are effective nematocidal fumigants whereas the known 1,2-epoxy-3,3-difluoro-3-chloro-2-difluorochloromethylpropane has no effect in this respect, showing mortality in test organisms substantially similar to that when such organisms are confined with no toxicant present.

EXAMPLE 4

The compounds of Examples 1 and 2 were further tested as fumigants against various stored product insects including confused flour beetle adults (*Tribolium confusum*) (CFB), lesser meal worm adults (*Alphitobius diaperinus*) (LMW) and black carpet beetle adults (*Attagenus piceus*) (BCB). The known compound 1,2-epoxy-3,3-difluoro-3-chloro-2-difluorochloromethyl-propane was also tested.

In carrying out the tests, ten insects of each species were placed in 1.5 inch diameter salve tins with perforated lids. A small amount of food was placed in each tin. The tins were placed in gallon jars, and the appropriate dosages of the toxicants were placed on cellucotton wads in the jars which were then sealed. After 24 hours exposure, insect containers were removed from the jars and mortality counts made. Mortality data taken 5 days after exposure are shown in Table II below.

TABLE II.—STORED PRODUCT INSECT FUMIGANT TESTS

| | Dosage lb./ 1,000 cu. ft. | Percent mortality after 5 days | | |
|---|---|---|---|---|
| | | CFB | LMW | BCB |
| Compound: | | | | |
| Example 1(X=H) | 1.0 | 100 | 100 | 100 |
| | 0.5 | 40 | 100 | 0 |
| Example 2(X=F) | 1.0 | 100 | 100 | 100 |
| | 0.5 | 80 | 0 | 100 |
| Known cpd. (X=Cl) | 1.0 | 100 | 100 | 100 |
| | 0.5 | 100 | 80 | 100 |

It is apparent from Table II that the new compounds of our invention are excellent fumigants for stored product insects and that in this respect they are about equal to the known chlorine substituted compound.

While the foregoing describes the preferred embodiments of our invention, it will be understood that departures can be made therefrom within the scope of the specification and claims.

We claim:
1. Flourinated epoxy compounds of the formula

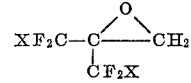

wherein each X is the same and is a member selected from the group consisting of hydrogen and fluorine.
2. 1,2-epoxy-3,3,3-trifluoro-2 - trifluoromethyl-propane.
3. 1,2-epoxy-3,3-difluoro-2-difluoromethyl-propane.

References Cited

FOREIGN PATENTS 619,846   5/1961   Canada _____ 260—348.6

OTHER REFERENCES

Smith, D. et al.: Ind. Eng. Chem., 49:1241 (1957).

NORMA S. MILESTONE, Primary Examiner

U.S. Cl. X.R.

424—278